United States Patent
Ohkawa

(10) Patent No.: US 10,025,543 B2
(45) Date of Patent: Jul. 17, 2018

(54) IMAGE PROCESSING DEVICE, IMAGE FORMING APPARATUS, AND IMAGE PROCESSING METHOD FOR PRINTING AN IMAGE BASED ON PRINT SETTINGS DEFINED BY A TEMPLATE

(71) Applicant: FUJI XEROX CO., LTD., Tokyo (JP)

(72) Inventor: Kazuhiro Ohkawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/355,936

(22) Filed: Nov. 18, 2016

(65) Prior Publication Data

US 2017/0371604 A1    Dec. 28, 2017

(30) Foreign Application Priority Data

Jun. 24, 2016  (JP) ................................. 2016-125254

(51) Int. Cl.
G06F 3/12       (2006.01)
H04N 1/00       (2006.01)

(52) U.S. Cl.
CPC .......... *G06F 3/1256* (2013.01); *G06F 3/1205* (2013.01); *G06F 3/1208* (2013.01); *G06F 3/1257* (2013.01); *H04N 1/00973* (2013.01)

(58) Field of Classification Search
None
See application file for complete search history.

(56) References Cited

U.S. PATENT DOCUMENTS 8,390,861 B2 *   3/2013  Okada ................... G06F 3/1205
                                                358/1.13
2012/0113470 A1 * 5/2012  Atsumi ................. G06F 3/1204
                                                358/1.15

FOREIGN PATENT DOCUMENTS

| JP | 2003-271614 A | 9/2003 |
| JP | 2010-198417 A | 9/2010 |
| JP | 2012-106453 A | 6/2012 |

* cited by examiner

*Primary Examiner* — Thomas D Lee
(74) *Attorney, Agent, or Firm* — Oliff PLC

(57) ABSTRACT

An image processing device includes a memory and a generating and outputting unit. The memory stores a template defining settings of printing to be performed by an image forming unit. If an instructing operation of instructing to perform test printing with the template is performed on a screen displaying the template, the generating and outputting unit generates and outputs instruction data for instructing the image forming unit to perform the test printing reflecting the settings of the template.

15 Claims, 16 Drawing Sheets

FIG. 4

| INSTRUCTION DATA LIST | | | | | B1 |
|---|---|---|---|---|---|
| HISTORY | PENDING | QUEUED | COMPLETED | ERROR | |
| ID | INSTRUCTION DATA NAME | SIZE | RECEPTION START DATE AND TIME | COMPLETION DATE AND TIME | |
| 001 | ... | ... | ... | ... | |
| 002 | ... | ... | ... | ... | |
| 003 | ... | ... | ... | ... | |
| 004 | ... | ... | ... | ... | |
| 005 | ... | ... | ... | ... | |
| 006 | ... | ... | ... | ... | |
| | | | | OK | CANCEL |

FIG. 5

| INSTRUCTION DATA LIST | | | | | B1 |
|---|---|---|---|---|---|
| HISTORY | PENDING | QUEUED | COMPLETED | ERROR | |
| ID | INSTRUCTION DATA NAME | SIZE | RECEPTION START DATE AND TIME | COMPLETION DATE AND TIME | |
| 001 | · · | | | | |
| 002 | · · | OPERATION MENU | | B2 | |
| 003 | · · | XXX ←A1<br>XXX<br>PROPERTIES ← A2<br>START PRINT ← A3<br>START TEST PRINT ← A4<br>TEST PRINT WITH TEMPLATE ← | | | |
| 004 | · · | | | | |
| 005 | · · | | | | |
| 006 | · · · | · · · | · · · | · · · | |

OK    CANCEL

FIG. 8

| INSTRUCTION DATA LIST | | | | | B1 |
|---|---|---|---|---|---|
| HISTORY | PENDING | QUEUED | COMPLETED | ERROR | |
| ID | INS D | SELECTION OF TEMPLATE B5 | | ETION D TIME | |
| 001 | | TEMPLATE NAME | COMMENT | • | |
| 002 | | BUSINESS CARD PRINT | • • • | • | |
| 003 | | PHOTO PRINT | • • • | • | |
| 004 | | CATALOG PRINT | • • • | • | |
| 005 | | A8 — START PRINT | CANCEL  C1 | • | |
| 006 | | | | • | |
| | | | OK | CANCEL | |

FIG. 10

| INSTRUCTION DATA LIST | | | | | B1 |
|---|---|---|---|---|---|
| HISTORY | PENDING | QUEUED | COMPLETED | ERROR | |

STATUS OF TEST PRINT  B6

TEST PRINT WITH TEMPLATE FOR PHOTO PRINT HAS COMPLETED.
DO YOU WANT SETTINGS TO BE REFLECTED?

A11 — REFLECT

A12 — PERFORM TEST PRINT WITH ANOTHER TEMPLATE

A13 — COMPLETE TEST PRINT

OK    CANCEL

FIG. 13

| TEMPLATE EDITING SCREEN G1 | | | | B11 |
|---|---|---|---|---|
| SIMPLE SETTING | SHEET | LAYOUT | IMAGE QUALITY | OUTPUT |

- BASIC
- EJECTION
- FINISHING
- MIXED SIZES
- POSITION AND MAGNIFICATION

☑ DENSITY  1 - 9  ← G2

☑ DUPLEX  OFF
  ✓ LONG-SIDE BINDING
    SHORT-SIDE BINDING
  ✓ HEAD-TO-HEAD
  ✓ HEAD-TO-TOE  ← G3

☑ ☐ ROTATE IMAGE BY 180 DEGREES
☐ ☑ HORIZONTALLY FLIP IMAGE  ← G4

NUMBER OF TEMPLATES  10  ← G5
GROUP NAME  AAA  ← G6

GENERATE  CANCEL
A21

FIG. 14

| SELECTION OF TEMPLATE GROUP | B12 |
|---|---|
| GROUP NAME | COMMENT |
| BUSINESS CARD PRINT GROUP 1 | ... |
| BUSINESS CARD PRINT GROUP 2 | ... |
| CATALOG PRINT GROUP 1 | ... |

A22 — START PRINT     CANCEL   C21

FIG. 15

| TEMPLATE EDITING SCREEN | | | | B11 |

| SIMPLE SETTING | SHEET | LAYOUT | IMAGE QUALITY | OUTPUT |

- BASIC
- EJECTION
- FINISHING
- MIXED SIZES
- POSITION AND MAGNIFICATION

☑ DENSITY  1 - 9
☑ DUPLEX  OFF
  ✓ LONG-SIDE BINDING        G11
  ✓ SH  WEIGHT SETTING
  ✓ HE     LONG-SIDE BINDING   50%
  ✓ HE     HEAD-TO-HEAD        25%
           HEAD-TO-TOE         25%
☐ ROTATE IM
☑ HORIZONTALLY FLIP IMAGE

NUMBER OF TEMPLATES  10    [GENERATE]  [CANCEL]
GROUP NAME  AAA                A21

FIG. 17

| PROPERTY SCREEN OF BUSINESS CARD PRINT 1 (COPY 1) | | | | B15 |
|---|---|---|---|---|
| SIMPLE SETTING | SHEET | LAYOUT | IMAGE QUALITY | OUTPUT |

| | |
|---|---|
| RIP TYPE | RIP TYPE<br>☐ CPSI  ☒ APPE |
| SHEET SIZE | SHEET SIZE |
| NUMBER OF COPIES | SAME AS DOCUMENT SIZE ▽ |
| SCREEN | ENLARGEMENT/REDUCTION |
| COLOR MODE | ☐ OFF    ☐ ENLARGEMENT/REDUCTION |
| LAYOUT | ☒ REDUCTION ONLY |
| SHEET TRAY | |

A25 — REFLECT EDITING    CANCEL — A26

IMAGE PROCESSING DEVICE, IMAGE FORMING APPARATUS, AND IMAGE PROCESSING METHOD FOR PRINTING AN IMAGE BASED ON PRINT SETTINGS DEFINED BY A TEMPLATE

CROSS-REFERENCE TO RELATED APPLICATIONS

This application is based on and claims priority under 35 USC 119 from Japanese Patent Application No. 2016-125254 filed Jun. 24, 2016.

BACKGROUND

Technical Field

The present invention relates to an image processing device, an image forming apparatus, and an image processing method.

SUMMARY

According to an aspect of the invention, there is provided an image processing device including a memory and a generating and outputting unit. The memory stores a template defining settings of printing to be performed by an image forming unit. If an instructing operation of instructing to perform test printing with the template is performed on a screen displaying the template, the generating and outputting unit generates and outputs instruction data for instructing the image forming unit to perform the test printing reflecting the settings of the template.

BRIEF DESCRIPTION OF THE DRAWINGS

Exemplary embodiments of the present invention will be described in detail based on the following figures, wherein:

FIG. 4 is a diagram illustrating an example of a displayed instruction data list;

FIG. 5 is a diagram illustrating an example of a displayed operation menu;

FIG. 8 is a diagram illustrating an example of the displayed template list;

FIG. 10 is a diagram illustrating an example of a displayed status of test printing;

FIG. 13 is a diagram illustrating an example of a template editing screen;

FIG. 14 is a diagram illustrating an example of a displayed list of groups;

FIG. 15 is a diagram illustrating an example of a template editing screen of a modified example;

FIG. 17 is a diagram illustrating an example of a property screen of a template.

DETAILED DESCRIPTION

1. Exemplary Embodiment

Figure 1:
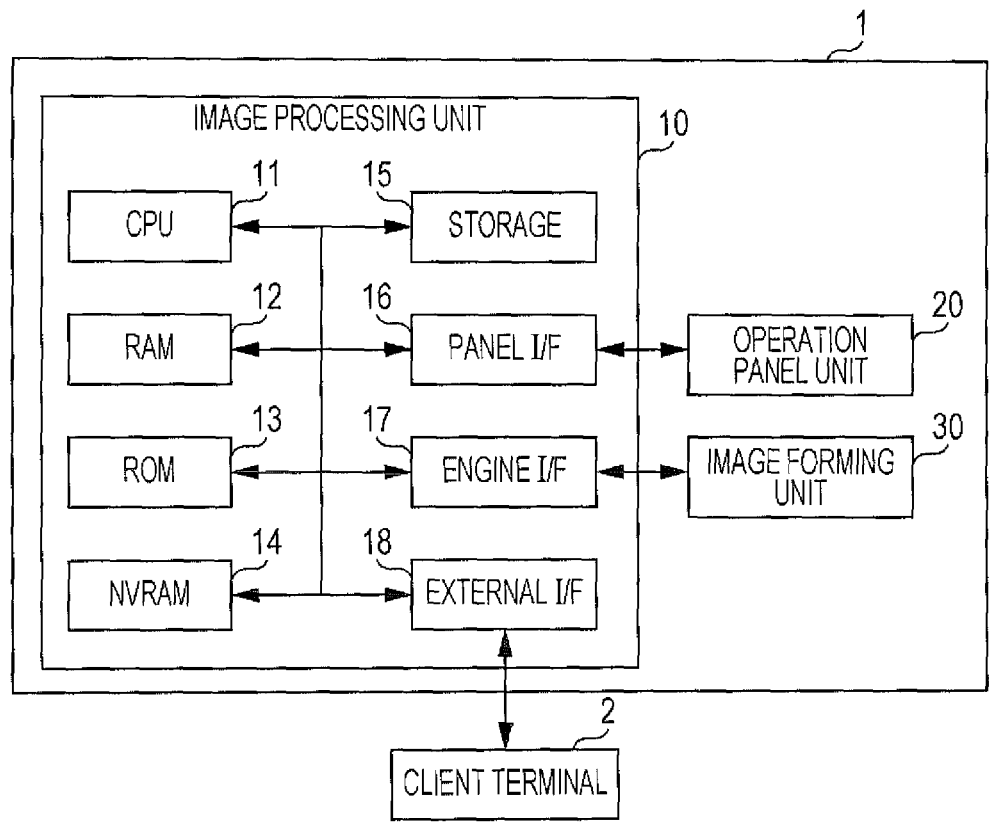
FIG. 1 is a diagram illustrating a hardware configuration of an image forming apparatus according to an exemplary embodiment.

FIG. 1 illustrates a hardware configuration of an image forming apparatus 1 according to an exemplary embodiment. The image forming apparatus 1 is an apparatus that forms (prints) an image on a medium such as a sheet. FIG. 1 illustrates a client terminal 2 that receives an operation of instructing the image forming apparatus 1 to perform printing. A user operates the client terminal 2 to perform operations such as specifying the image to be printed on the medium and determining settings of the printing (settings such as sheet, layout, color, and image quality). Thereby, the client terminal 2 transmits instruction data (also referred to as a job) representing the contents of the print instruction to the image forming apparatus 1, and the image forming apparatus 1 forms an image in accordance with the instruction represented by the received instruction data.

The image forming apparatus 1 includes an image processing unit 10, an operation panel unit 20, and an image forming unit 30. The image processing unit 10 processes the image represented by the above-described instruction data, and converts the image into a format in which the image forming unit 30 is capable of forming the image on the medium. The operation panel unit 20, which includes a display and a touch panel provided on a surface of the display, displays the image and receives the operation performed by the user. Based on image data obtained through the conversion by the image processing unit 10, the image forming unit 30 forms the image represented by the image data on the medium with an electrophotographic system, for example.

The image processing unit 10 is a computer including a central processing unit (CPU) 11, a random access memory (RAM) 12, a read-only memory (ROM) 13, a non-volatile RAM (NVRAM) 14, a storage 15, a panel interface (I/F) 16, an engine I/F 17, and an external I/F 18.

The CPU 11 executes programs stored in the ROM 13, the NVRAM 14, and the storage 15 by using the RAM 12 as a work area, to thereby control the operations of the respective units. The NVRAM 14 is a readable and writable memory that retains stored contents even after power-off of the image forming apparatus 1, and stores data and programs used by the CPU 11 for control. The storage 15 is a memory, such as a hard disk drive (HDD) or a solid state drive (SSD), which stores data and programs used by the CPU 11 for control.

The panel I/F 16 is connected to the operation panel unit 20 to relay the exchange between the operation panel unit 20 and the CPU 11 of image data of the image displayed by the operation panel unit 20 and operation data representing the operation received by the operation panel unit 20. The engine I/F 17 is connected to the image forming unit 30, and if supplied by the CPU 11 with the instruction data representing the print instruction to the image forming unit 30, relays and supplies the instruction data to the image forming unit 30. The external I/F 18 is connected to the client terminal 2, and relays the exchange of data between the client terminal 2 and the CPU 11. For example, the external I/F 18 receives and supplies the instruction data transmitted from the client terminal 2 to the CPU 11.

Figure 2:
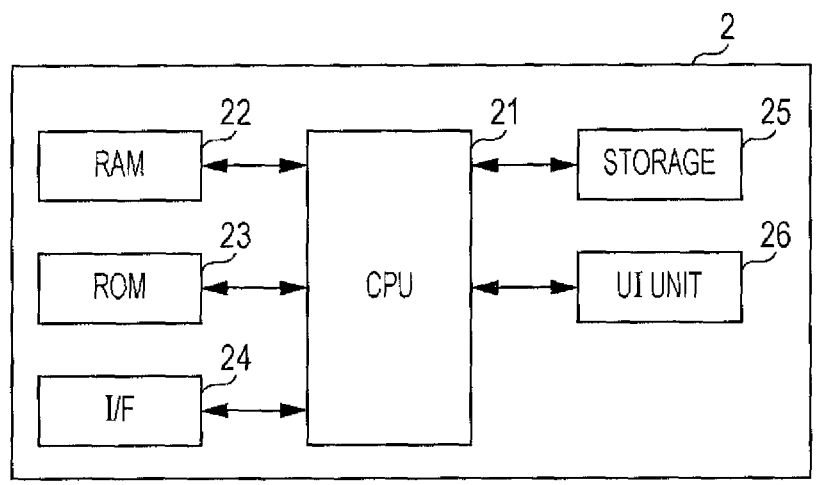
FIG. 2 is a diagram illustrating a hardware configuration of a client terminal.

FIG. 2 illustrates a hardware configuration of the client terminal 2. The client terminal 2 is a computer including a CPU 21, a RAM 22, a ROM 23, an I/F 24, a storage 25, and an user interface (UI) unit 26. The CPU 21, the RAM 22, the ROM 23, and the storage 25 are hardware similar to hardware with the same names illustrated in FIG. 1. The I/F 24 is connected to the image forming apparatus 1 to relay the exchange of data between the image forming apparatus 1 and the CPU 21. The UI unit 26, which includes a display, a keyboard, and a mouse, for example, displays the image and receives the operation performed by the user.

The CPU 11 included in the image processing unit 10 and the CPU 21 included in the client terminal 2 control the respective units by executing the respective programs, to thereby realize functions described below. In the present exemplary embodiment, a description will be given of functions that operate when the user operates the client terminal 2.

Figure 3:
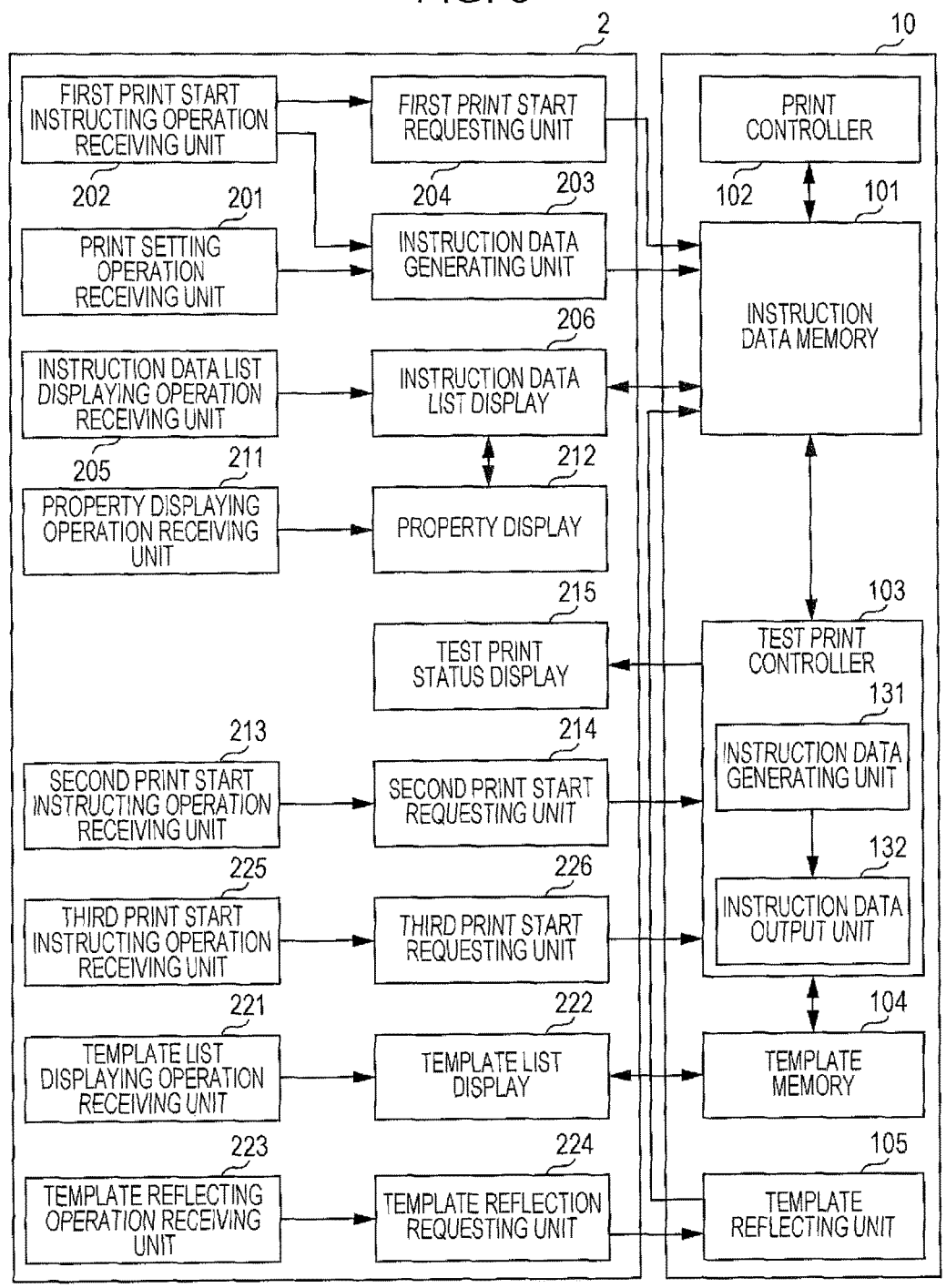
FIG. 3 is a diagram illustrating a functional configuration realized by an image processing unit and the client terminal.

FIG. 3 illustrates a functional configuration realized by the image processing unit 10 and the client terminal 2. The image processing unit 10 includes an instruction data memory 101, a print controller 102, a test print controller 103, a template memory 104, and a template reflecting unit 105.

The client terminal 2 includes a print setting operation receiving unit 201, a first print start instructing operation receiving unit 202, an instruction data generating unit 203, a first print start requesting unit 204, an instruction data list displaying operation receiving unit 205, an instruction data list display 206, a property displaying operation receiving unit 211, a property display 212, a second print start instructing operation receiving unit 213, a second print start requesting unit 214, a test print status display 215, a template list displaying operation receiving unit 221, a template list display 222, a template reflecting operation receiving unit 223, a template reflection requesting unit 224, a third print start instructing operation receiving unit 225, and a third print start requesting unit 226.

The print setting operation receiving unit 201 receives a setting operation performed by the user on a setting screen for determining the settings of the printing (image formation). The settings of the printing include the aforementioned sheet, layout, color, and image quality. The print setting operation receiving unit 201 receives an operation of confirming the settings as the setting operation, and notifies the instruction data generating unit 203 of the selected settings.

The first print start instructing operation receiving unit 202 receives an operation performed by the user to instruct to start the printing. For example, the first print start instructing operation receiving unit 202 receives, as a print start instructing operation, an operation of pressing a print start button performed on a print screen for instructing to perform the printing. After receiving the instructing operation, the first print start instructing operation receiving unit 202 notifies the instruction data generating unit 203 and the first print start requesting unit 204 of the receipt of the instructing operation.

After the first print start instructing operation receiving unit 202 receives the print start instructing operation, the instruction data generating unit 203 generates instruction data representing an instruction to perform the printing with the settings notified by the print setting operation receiving unit 201, that is, the currently selected settings. The instruction data includes image information representing the image to be formed by the image forming unit 30 and setting information representing the settings of the printing. The instruction data generating unit 203 transmits the generated instruction data to the image processing unit 10.

The instruction data memory 101, which is a function of storing the instruction data for instructing to perform the printing, stores the instruction data transmitted from the client terminal 2, for example. The instruction data memory 101 forms a queue for storing instruction data items. The instruction data items stored in this queue are sequentially extracted and used for printing. As well as the instruction data in the queue, the instruction data memory 101 also stores print-completed instruction data and print-suspended instruction data. These types of instruction data may be read as necessary to be utilized for a new print.

The print controller 102 controls the printing operation performed by the image forming unit 30. The print controller 102 monitors the queue formed by the instruction data memory 101. If instruction data items are stored in the queue, the print controller 102 sequentially reads the stored instruction data items, and instructs the image forming unit 30 to form images in accordance with the instructions represented by the read instruction data items.

After the first print start instructing operation receiving unit 202 receives the print start instructing operation, the first print start requesting unit 204 transmits request data for requesting to start printing to the image processing unit 10, to thereby request the image processing unit 10 to start printing. If the instruction data is generated by the instruction data generating unit 203, the request data requests printing based on the generated instruction data. If the instruction data stored in the instruction data memory 101 is utilized, the request data requests printing based on the utilized instruction data.

The instruction data list displaying operation receiving unit 205 receives an operation of displaying a list of instruction data items, and notifies the instruction data list display 206 of the receipt of this operation. The instruction data list display 206 displays a list of instruction data items stored in the instruction data memory 101. After receiving the notification from the instruction data list displaying operation receiving unit 205, that is, after the receipt of the operation of displaying the list of instruction data items, the instruction data list display 206 requests the image processing unit 10 to transmit the instruction data. The instruction data memory 101 receives this request, and reads and transmits the stored instruction data to the client terminal 2.

The instruction data list display 206 displays the list of instruction data items based on the transmitted instruction data.

FIG. 4 illustrates an example of the displayed instruction data list. In the example of FIG. 4, the instruction data list display 206 displays an instruction data list B1 including tabs indicating respective statuses such as "COMPLETED" and instruction data items in the "COMPLETED" status (a status in which the printing has completed) of the respective states. If the user selects one of the instruction data items included in the instruction data list B1 and performs a specific operation (right-clicking, for example) thereon, an operation menu for performing an operation on the selected instruction data item (an instruction data item corresponding to identification (ID) "002" in the example of FIG. 4) is displayed.

FIG. 5 illustrates an example of the displayed operation menu. FIG. 5 illustrates an operation menu B2 including a property button A1, a print start button A2, a test print start button A3, and a test print button A4 for test printing with a template. If an operation of pressing the print start button A2 is performed, the first print start instructing operation receiving unit 202 receives the operation as the print start instructing operation, and the first print start requesting unit 204 requests printing based on the selected instruction data item. Consequently, the selected instruction data item is stored in the queue, and the printing is performed.

The second print start instructing operation receiving unit 213 receives an operation performed by the user to instruct to start test printing. Test printing refers to printing performed to judge the quality of the image to be printed. In the present exemplary embodiment, test printing refers to printing, one by one, respective pages of a document to be printed. The second print start instructing operation receiving unit 213 receives an operation of pressing the test print start button A3 as a test print start instructing operation, and notifies the second print start requesting unit 214 of the receipt of the test print start instructing operation.

After the second print start instructing operation receiving unit 213 receives the test print start instructing operation, the second print start requesting unit 214 transmits test request data for requesting to start the test printing to the image processing unit 10. The second print start requesting unit 214 transmits this test request data to the image processing unit 10 to thereby request the image processing unit 10 to start the test printing. The test request data includes information identifying the instruction data to be used in the test printing (the ID of the instruction data, for example).

The test print controller 103 controls the test printing operation performed by the image forming unit 30. The test print controller 103 receives the test request data, and stores in a queue the instruction data identified from the information included in the test request data. The test print controller 103 monitors the queue. Then, when it comes to the turn of the stored instruction data to be read, the test print controller 103 reads the instruction data, and instructs the image forming unit 30 to form the image of each of the pages on one medium in accordance with the instruction represented by the read instruction data.

With the printing performed by the image forming unit 30 based on this instruction, the respective pages of the document are printed (that is, test-printed) one by one. In the text printing, the test print controller 103 thus controls the printing operation with the instruction data already stored in the instruction data memory 101. The test print controller 103 includes an instruction data generating unit 131 and an instruction data output unit 132, which are employed in test printing with a later-described template.

The property displaying operation receiving unit 211 receives a displaying operation of displaying properties of the selected instruction data. The properties of the instruction data refer to information of the instruction data, which includes image data instructed to be printed by the instruction data and the settings of the printing therefor, for example. The property displaying operation receiving unit 211 receives an operation of pressing the property button A1 illustrated in FIG. 5 as a property displaying operation, and notifies the property display 212 of the receipt of the property displaying operation.

With the notification received from the property displaying operation receiving unit 211, the property display 212 determines that the property displaying operation has been received, and displays the properties of the selected instruction data.

Figure 6:
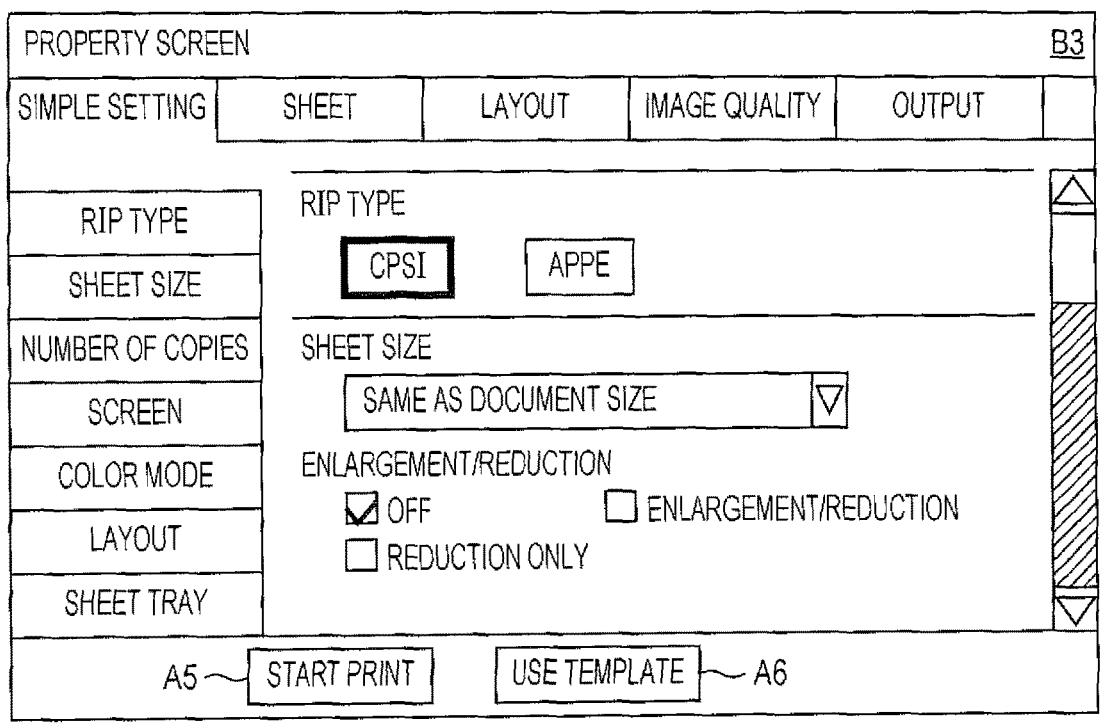
FIG. 6 is a diagram illustrating an example of displayed properties.

FIG. 6 illustrates an example of the displayed properties. In the example of FIG. 6, the property display 212 displays a property screen B3 including a list of settings represented by the selected instruction data. The property display 212 further displays a print start button A5 and a template use button A6 on the property screen B3. If an operation of pressing the print start button A5 is performed, the operation is received by the first print start instructing operation receiving unit 202 as the print start instructing operation, and printing based on the instruction data corresponding to the displayed properties is performed.

If an operation of pressing the template use button A6 is performed, the template list displaying operation receiving unit 221 receives this operation as a displaying operation of displaying a list of templates. After receiving this displaying operation, the template list displaying operation receiving unit 221 notifies the template list display 222 of the receipt of the displaying operation.

With the notification received from the template list displaying operation receiving unit 221, the template list display 222 determines that a template list displaying operation has been received, and displays the list of templates. A template refers to data representing predetermined settings of printing. In the present exemplary embodiment, the templates are stored in the image processing unit 10. Therefore, the template list display 222 requests the image processing unit 10 to transmit the templates.

The template memory 104 is a function of storing the templates that define the settings of the printing performed by the image forming unit 30, and is an example of a "memory" according to an exemplary embodiment of the present invention. The template memory 104 receives the request for the templates from the client terminal 2, and reads and transmits the stored templates to the client terminal 2. The template list display 222 receives the thus-transmitted templates, and displays the templates in a list.

Figure 7:
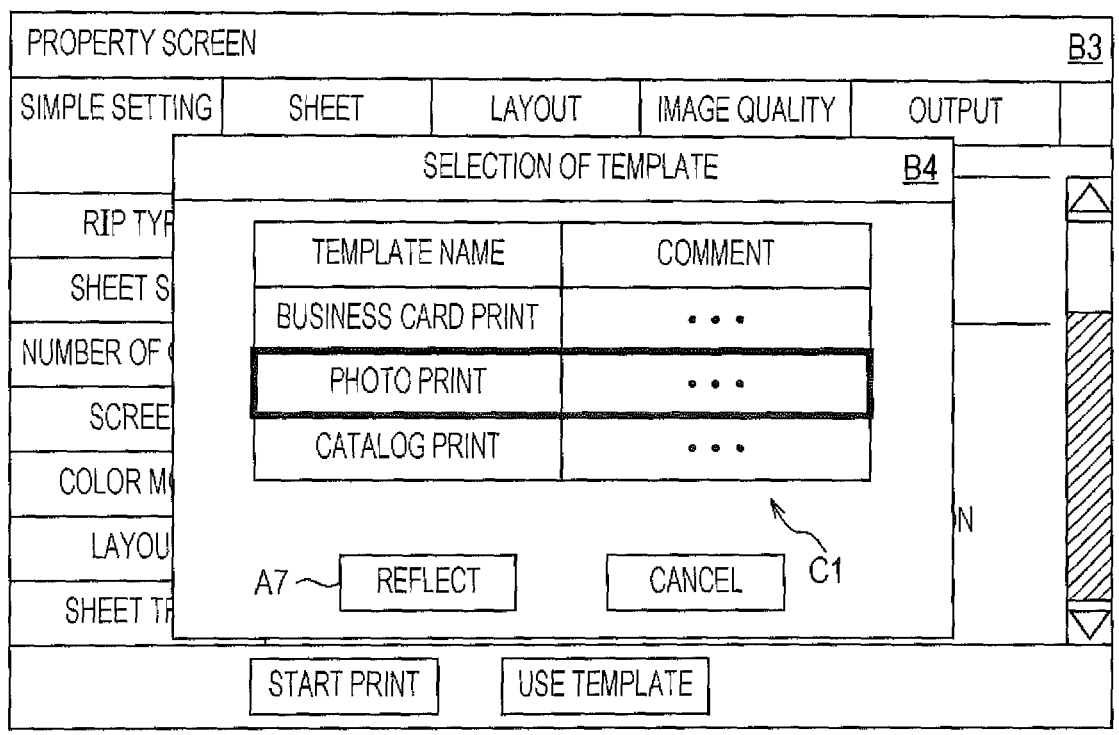
FIG. 7 is a diagram illustrating an example of a displayed template list.

FIG. 7 illustrates an example of the displayed template list. In the example of FIG. 7, the template list display 222 displays a template selection image B4 including a template list C1 (a list including templates for "BUSINESS CARD PRINT," "PHOTO PRINT," and "CATALOG PRINT") over the property screen B3 illustrated in FIG. 6. The template list display 222 further displays a template reflection button A7 and a template reflection cancellation button in the template selection image B4.

In the example of FIG. 7, the template for "PHOTO PRINT" is selected. If an operation of pressing the template reflection button A7 is performed in this state, the template reflecting operation receiving unit 223 receives this operation as a reflecting operation of reflecting the settings of the template for "PHOTO PRINT" in the instruction data, and notifies the template reflection requesting unit 224 of the receipt of the reflecting operation.

The template reflection requesting unit 224 receives the notification from the template reflecting operation receiving unit 223, and transmits to the image processing unit 10 request data for requesting to reflect the settings of the template selected in the template selection screen image B4 in the settings of the instruction data corresponding to the displayed property screen B3. The template reflection requesting unit 224 transmits this request data to the image processing unit 10 to thereby request the image processing unit 10 to reflect the template in the instruction data.

The template reflecting unit 105 receives the request data transmitted from the template reflection requesting unit 224, reads the instruction data indicated by the request data from the instruction data memory 101, and reflects the settings of the template indicated by the request data (the template for "PHOTO PRINT" in the example of FIG. 7) in the read instruction data. The template reflecting unit 105 overwrites the instruction data memory 101 with the instruction data reflecting the settings. If the template reflecting operation is performed on the template selection image B4, the settings of the instruction data are thus changed to the settings of the template.

If an operation of pressing the test print button A4 for test printing with a template included in the operation menu B2 illustrated in FIG. 5 is performed, the template list displaying operation receiving unit 221 also receives this operation as the displaying operation of displaying the list of templates. If the template list displaying operation receiving unit 221 receives this displaying operation, the template list display 222 displays the list of templates as follows.

FIG. 8 illustrates an example of the displayed template list. In the example of FIG. 8, the template list display 222 displays a template selection image B5 including the template list C1 over the instruction data list B1 illustrated in FIG. 5. The template list display 222 further displays a print start button A8 and a cancellation button for cancelling the test printing with a template in the template selection image B5.

If an operation of pressing the print start button A8 is performed by the user, the third print start instructing operation receiving unit 225 receives this operation as an operation of instructing to start the test printing with a template (the template for "PHOTO PRINT" in the example of FIG. 8), and notifies the third print start requesting unit 226 of the receipt of the operation.

The third print start requesting unit 226 receives the notification from the third print start instructing operation receiving unit 225, and transmits to the image processing unit 10 test request data for requesting to start the test printing with the settings of the template selected in the template selection image B5 (the template for "PHOTO PRINT" in the example of FIG. 8) reflected in the settings of the instruction data selected in the instruction data list B1 (the instruction data corresponding to ID "002" in the example of FIG. 5).

The third print start requesting unit 226 transmits this test request data to the image processing unit 10 to thereby request the image processing unit 10 to start the test printing with the template. The test request data includes information identifying the instruction data to be used in the test printing (the ID of the instruction data, for example) and the selected template.

The test print controller 103 controls the operation of the image forming unit 30 to cause the image forming unit 30 to perform the test printing with the template. The instruction data generating unit 131 included in the test print controller 103 receives the test request data, and reads from the instruction data memory 101 the instruction data identified from the information included in the test request data. The instruction data generating unit 131 generates new instruction data, which corresponds to the read instruction data with the settings thereof changed to the settings of the template indicated by the test request data. That is, in this process, the original instruction data remains stored in the instruction data memory 101.

The instruction data generating unit 131 further generates, as the new instruction data, data representing an instruction to print information identifying the template on the medium on which the test printing with the template is performed. The information identifying the template is the template name illustrated in FIG. 8 (such as "BUSINESS CARD PRINT"), for example. The instruction data generating unit 131 supplies the thus-newly generated instruction data to the instruction data output unit 132. The instruction data output unit 132 outputs the supplied instruction data to the instruction data memory 101, and stores the instruction data in the queue. Thereafter, the respective units operate as in the test printing. Thereby, the test printing is performed based on the instruction data reflecting the settings of the template.

Figure 9:
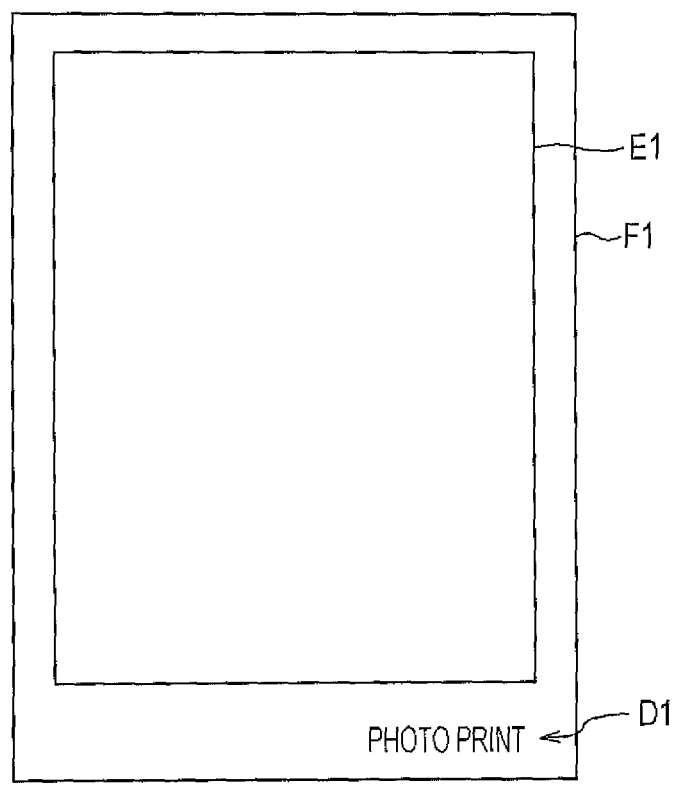
FIG. 9 is a diagram illustrating an example of a medium on which an image is formed by test printing.

FIG. 9 illustrates an example of the medium on which the image is formed by the test printing. FIG. 9 illustrates a medium F1 on which identification information D1 of the template reading "PHOTO PRINT" and a photo image E1 are formed. With the identification information D1 thus formed, it is easier to identify the template used in the test printing than when information identifying the template is not formed on the medium.

As described above, if the instructing operation of instructing to perform the test printing with a template (the operation of pressing the print start button A8 in the example of FIG. 8) is performed, the test print controller 103 generates and outputs the instruction data for instructing the image forming unit 30 to perform the test printing reflecting the settings of the template. The test print controller 103 is an example of a "generating and outputting unit" according to an exemplary embodiment of the present invention.

This instructing operation is performed on a screen displaying the template to be used in the test printing (the screen displaying the template selection image B5 in the example of FIG. 8). For example, the instructing operation of instructing to perform the test printing with the test print start button A3 illustrated in FIG. 5 is performed on a screen not displaying the template, as illustrated in FIG. 5. Further, when reflecting the template illustrated in FIG. 7, the operation of pressing the print start button A5 illustrated in FIG. 6 serves as the instructing operation of instructing to start the printing, which is also performed on a screen not displaying the templates.

Herein, the instruction data read from the instruction data memory 101 by the test print controller 103 is referred to as first instruction data, and the instruction data generated from the first instruction data by the test print controller 103 is referred to as second instruction data. When the first instruction data and a template are selected, the test print controller 103 generates, separately from the first instruction data, the second instruction data corresponding to the first instruction data with the settings thereof changed to the settings of the template, and outputs the second instruction data as the instruction data for instructing to perform the test printing.

The test print controller 103 notifies the client terminal 2 of the status of the test printing. Based on this notification, the test print status display 215 displays the status of the test printing.

FIG. 10 illustrates an example of the displayed status of the test printing. In FIG. 10, the test print status display 215 displays a test print status image B6. The test print status image B6 displays a character string "TEST PRINT WITH TEMPLATE FOR PHOTO PRINT HAS COMPLETED. DO YOU WANT SETTINGS TO BE REFLECTED?" a setting reflection button A11, a test print button A12 for test printing with another template, and a test print completion button A13.

If an operation of pressing the test print button A12 for test printing with another template is performed, the template list display 222 again displays the template selection image B5 illustrated in FIG. 8. If an operation of pressing the test print completion button A13 is performed, the display returns to, for example, the instruction data list B1 illustrated in FIG. 4. If an operation of pressing the setting reflection button A11 is performed, the template reflecting operation receiving unit 223 receives this operation as a reflecting operation of reflecting the settings of the template for "PHOTO PRINT" in the instruction data, and notifies the template reflection requesting unit 224 of the receipt of the reflecting operation. With this notification, the template reflection requesting unit 224 and the template reflecting unit 105 perform the above-described operations, and the settings of the template used in the test printing are reflected in the instruction data.

As described above, the template reflecting operation receiving unit 223 receives, as the reflecting operation of reflecting the settings of the template, the specific operation (the operation of pressing the setting reflection button A11 performed on the screen including the test print status image B6 in this example) performed on the screen (the screen displayed even when an operation for displaying the screen is not performed by the user) displayed when the test printing is performed in accordance with the instruction of the above-described second instruction data (the instruction data generated by the test print controller 103). If this reflecting operation is performed, the template reflecting unit 105 changes the settings indicated by the first instruction data (the original instruction data) into the settings indicated by the second instruction data (that is, the settings of the template). The template reflecting unit 105 is an example of a "first changing unit" according to an exemplary embodiment of the present invention.

The image forming apparatus 1 and the client terminal 2 perform a test printing process of performing the test printing based on the above-described configuration.

Figure 11:
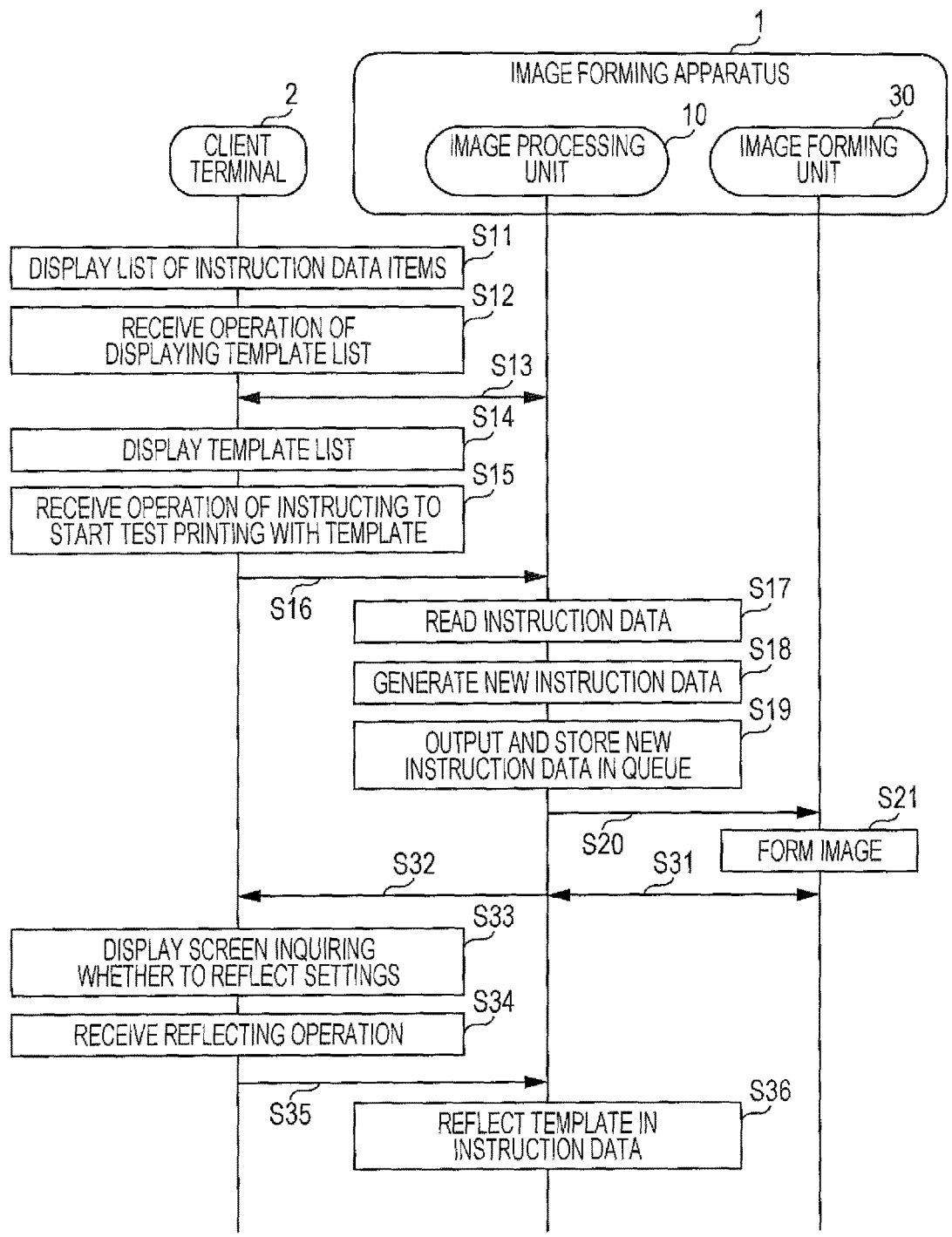
FIG. 11 is a diagram illustrating an example of a procedure of operations of respective apparatuses in an image forming process.

FIG. 11 illustrates an example of the procedure of operations of the respective apparatuses in the image forming process. This operation procedure starts upon transmission of the instruction data to the client terminal 2 from the image processing unit 10 following the operation of displaying the list of instruction data items performed by the user, for example. Firstly, the client terminal 2 (the instruction data list display 206) displays the list of instruction data items (the instruction data list B1 illustrated in FIG. 4, for example) (step S11).

The client terminal 2 (the template list displaying operation receiving unit 221) then receives the operation of displaying the template list (the operation of right-clicking the instruction data corresponding to ID "002" illustrated in FIG. 5 and pressing the test print button A4 for test printing with a template included in the displayed operation menu B2, for example) (step S12). This operation also serves as the operation of selecting the instruction data. Subsequently, the client terminal 2 (the template list display 222) requests the image processing unit 10 to transmit the templates, and the image processing unit 10 (the template memory 104) transmits the requested templates to the client terminal 2 (step S13).

The client terminal 2 (the template list display 222) displays the template list (the template list C1 illustrated in FIG. 8, for example) based on the templates transmitted at step S13 (step S14). The client terminal 2 (the third print start instructing operation receiving unit 225) then receives the operation of instructing to start the test printing with the instruction data selected at step S12 and the template selected at step S15 (the operation of pressing the print start button A8 illustrated in FIG. 8, for example) (step S15). Subsequently, the client terminal 2 (the third print start requesting unit 226) requests the image processing unit 10 to start the test printing with the template (step S16).

Based on the request received at step S16, the image processing unit 10 (the test print controller 103) reads the instruction data selected at step S12 from the instruction data stored in the image forming apparatus 1 (step S17). The image processing unit 10 (the test print controller 103) then generates the new instruction data which corresponds to the read instruction data with the settings thereof changed to the settings of the template, and which also indicates the instruction to print the identification information of the template on the medium (step S18). Subsequently, the image processing unit 10 (the test print controller 103) outputs and stores the generated new instruction data in the queue (step S19).

The image processing unit 10 (the test print controller 103) then reads the instruction data stored in the queue, and instructs the image forming unit 30 to form the image in accordance with the instruction represented by the read instruction data (step S20). The image forming unit 30 performs the test printing with the template by forming the image on the medium based on the instruction received at step S20 (step S21). The image processing unit 10 then detects that the image forming unit 30 has completed the printing (step S31), and notifies the client terminal 2 of the completion of the printing (step S32).

The client terminal 2 (the test print status display 215) displays the screen informing that the test printing with the template has completed and inquiring whether to reflect the settings of the template (the screen illustrated in FIG. 10, for example) (step S33). The client terminal 2 (the template reflecting operation receiving unit 223) then receives the reflecting operation of reflecting the template in the instruction data (step S34). Subsequently, the client terminal 2 (the template reflection requesting unit 224) requests the image processing unit 10 to reflect the template in the instruction data (step S35). In accordance with this request, the image processing unit 10 (the template reflecting unit 105) reflects the template in the instruction data (step S36).

As described above, in the test printing with the template, the present exemplary embodiment only requires the instructing operation of issuing the print instruction to be performed on the screen displaying the template (the operation of pressing the print start button A8 illustrated in FIG. 8, for example). Thereby, steps taken to use the template in the test printing are reduced as compared with when an operation of reflecting the template in the instruction data (the operation of pressing the template reflection button A7 illustrated in FIG. 7, for example) is required other than the operation of instructing to perform the test printing.

Further, in the present exemplary embodiment, when given instruction data (the first instruction data) and a template are selected, the second instruction data corresponding to the first instruction data with the settings thereof changed to the settings of the template is generated separately from the first instruction data. Thereby, steps taken to use the original instruction data (the first instruction data) after the test printing are reduced as compared with when the settings of the original instruction data are changed and overwritten.

Further, in the present exemplary embodiment, if the test printing reflecting the settings of the template is performed, the settings of the original instruction data (the first instruction data) are not changed, as described above. If a specific operation (the operation of pressing the setting reflection button A11) is performed on the screen displayed when the test printing is performed (the screen including the test print status image B6 illustrated in FIG. 10, for example), however, the settings of the original instruction data are changed to the settings of the template. Thereby, steps taken to reflect the template in the original instruction data are reduced as compared with when the operation for changing the settings (the operation of pressing the template reflection button A7)

is performed on another screen (the screen including the template selection image B4 illustrated in FIG. 7, for example).

2. Second Exemplary Embodiment

A description will be given below of a second exemplary embodiment of the present invention, focusing on differences from the first exemplary embodiment. While the test printing reflecting the settings of a single template is performed in the first exemplary embodiment, test printing reflecting the settings of plural templates is performed in the second exemplary embodiment.

Figure 12:
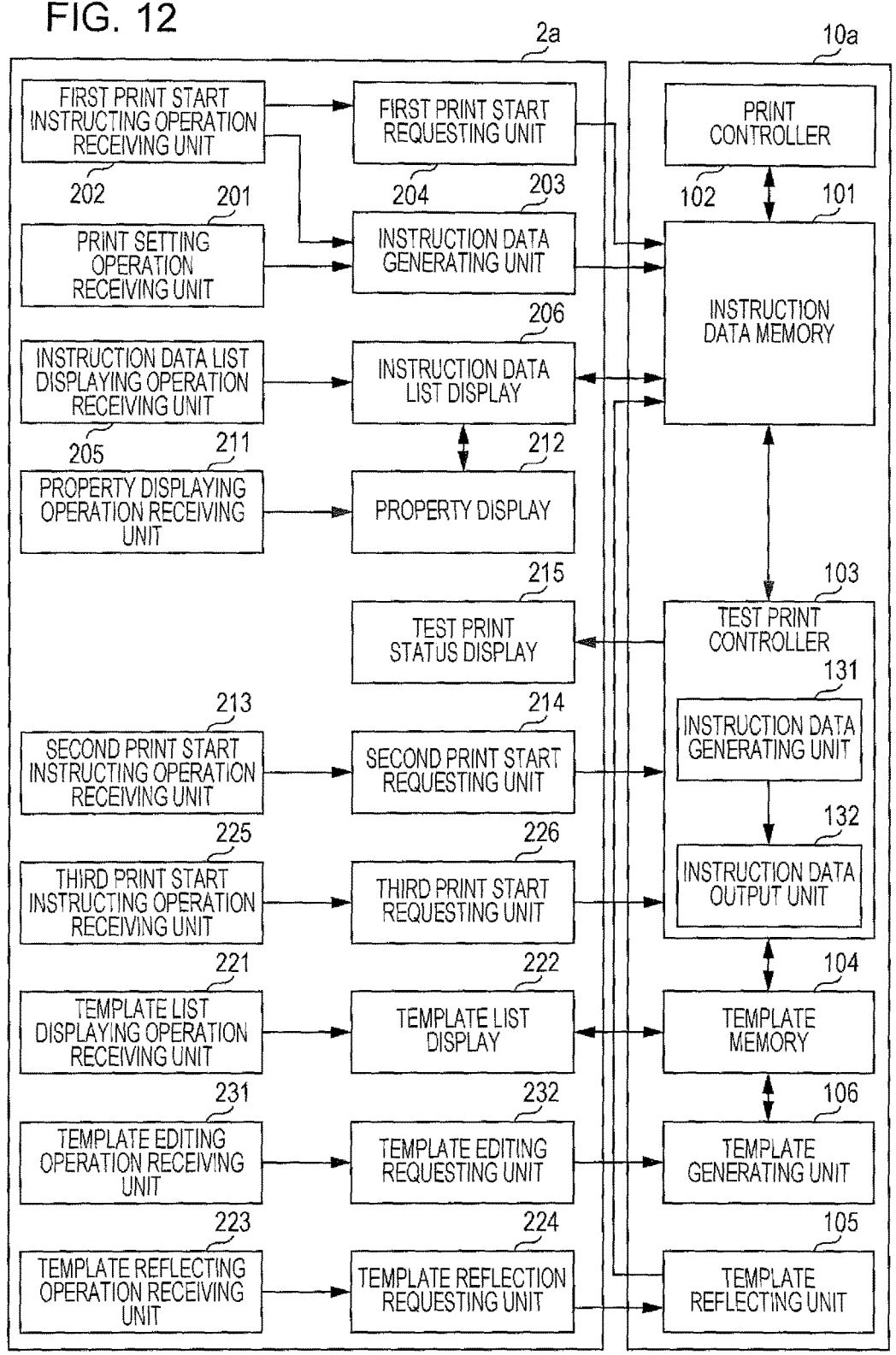
FIG. 12 is a diagram illustrating a functional configuration realized by a second exemplary embodiment.

FIG. 12 illustrates a functional configuration realized by the second exemplary embodiment. FIG. 12 illustrates functions realized by a client terminal 2a and an image processing unit 10a according to the second exemplary embodiment. The client terminal 2a includes a template editing operation receiving unit 231 and a template editing requesting unit 232 in addition to the units thereof illustrated in FIG. 3. The image processing unit 10a includes a template generating unit 106 in addition to the units thereof illustrated in FIG. 3. The client terminal 2a displays a template editing screen based on an operation performed by the user.

FIG. 13 illustrates an example of a template editing screen. In FIG. 13, the client terminal 2a displays a template editing screen B11. The template editing screen B11 displays allocation target checkboxes G1, a range specification field G2, an option specification field G3, an execution/inexecution specification field G4, a template number specification field G5, a group name specification field G6, and a template generation button A21. The allocation target checkboxes G1 are check fields for specifying items to be subjected to automatic allocation of settings. Automatic allocation refers to allocating mutually different settings to plural templates when the templates are generated.

The range specification field G2 is a display field for receiving an operation of specifying a range of numerical values to be automatically allocated, when the corresponding setting is expressed in numerical values. In the state of FIG. 13, a density range "1-9" (a range from 1 to 9) is specified in the range specification field G2. This range is specified by operation of up and down buttons or by direct input of numerical values. The option specification field G3 is a display field for receiving an operation of specifying options to be automatically allocated among plural options of a setting. In the state of FIG. 13, options "LONG-SIDE BINDING," "HEAD-TO-HEAD," and "HEAD-TO-TOE" are specified in the option specification field G3.

The execution/inexecution specification field G4 is a display field displaying settings each having two options: executing and not executing a specific operation. In the state of FIG. 13, a setting "ROTATE IMAGE BY 180 DEGREES" is to be automatically allocated. Further, a setting "HORIZONTALLY FLIP IMAGE" is not to be automatically allocated, but is checked through an operation by the user (that is, this operation is set to be executed). Any setting not to be automatically allocated may thus be specified by the user.

The template number specification field G5 is a display field for specifying the number of templates to be generated. The number of templates is specified by operation of up and down buttons or direct input of a numerical value. The group name specification field G6 is a display field for specifying the name of a group of the plural templates to be generated. In FIG. 13, a group name "AAA" is specified. The template editing operation receiving unit 231 receives an operation of determining specification contents in the respective specification fields as a template editing operation. The template editing operation receiving unit 231 further receives an operation of pressing the template generation button A21 as an operation of confirming the automatically allocated contents of the settings and instructing to start generating the plural templates.

After receiving this operation, the template editing operation receiving unit 231 notifies the template editing requesting unit 232 of the receipt of the operation. The template editing requesting unit 232 receives this notification, and requests the image processing unit 10a to generate the plural templates with the contents specified on the template editing screen B11. The template generating unit 106 of the image processing unit 10a receives this request and generates, based on the received request, the plural templates mutually different in the settings of specific items.

In the example of FIG. 13, there are nine patterns of density setting, three patterns of duplex setting, and two patterns of 180-degree image rotation setting, and the number of templates is specified to be ten. Therefore, the template generating unit 106 extracts ten combinations of settings from 9×3×2=54 combinations of settings, and generates templates according to the ten extracted combinations of settings. In the density setting in the present exemplary embodiment, for example, the template generating unit 106 randomly adopts one of the nine patterns of setting as the density setting for each of the templates.

The template generating unit 106 stores the thus-generated plural templates in the template memory 104 in association with the specified group name. The template memory 104 thus stores the group of the plural templates. Further, with the generation of a group of plural templates performed multiple times, the template memory 104 stores plural groups. The template list displaying unit 222 of the present exemplary embodiment displays a list of the thus-stored template groups.

FIG. 14 illustrates an example of the displayed list of groups. In the example of FIG. 14, the template list display 222 displays a template group selection screen B12 including a list C21 of groups "BUSINESS CARD PRINT GROUP 1," "BUSINESS CARD PRINT GROUP 2," and "CATALOG PRINT GROUP 1," a print start button A22, and a cancellation button for cancelling the selection of a group, and "BUSINESS CARD PRINT GROUP 2" is selected from the above-described groups.

If an operation of pressing the print start button A22 is performed in this state, the third print start instructing operation receiving unit 225 receives this operation as an operation of instructing to start test printing with the plural templates of the selected group, and notifies the third print start requesting unit 226 of the receipt of the operation. The third print start requesting unit 226 receives this notification, and issues a request to start the test printing with the plural templates of the selected group applied to the settings of the original instruction data (the instruction data selected in the instruction data list, for example).

The test print controller 103 controls the operation of the image forming unit 30 to cause the image forming unit 30 to perform the test printing with the plural templates of the selected group. Specifically, the test print controller 103 newly generates plural instruction data items for issuing respective instructions to perform plural test printing operations reflecting the plural templates of the group. The instruction data output unit 132 outputs the generated plural instruction data items to the instruction data memory 101, and stores the respective instruction data items in the queue.

Thereafter, the respective units operate as in the test printing. Thereby, the test printing operations based on the plural instruction data items reflecting the respective settings of the templates are performed. In the present exemplary embodiment, therefore, the plural test printing operations continue without a suspension until all thereof are completed.

When plural templates mutually different in settings are stored, test printing with the plural templates may be executed by performing multiple operations of starting the test printing with a template by selecting a difference one of the templates in each of the multiple operations. In the present exemplary embodiment, on the other hand, the test printing operations with the plural templates of the group are executed if the operation of selecting one of the above-described groups is performed. According to the present exemplary embodiment, therefore, steps taken to try the plural patterns of settings in the test printing are reduced as compared with when the operation of starting the test printing with a template is performed multiple times. Further, with the plural templates generated based on the automatic allocation of settings, steps taken to generate the plural templates are reduced as compared with when the settings of the respective templates are individually configured by the user.

3. Modified Examples

Each of the above-described exemplary embodiments is merely an example of an exemplary embodiment of the present invention, and may be modified as follows. Further, the exemplary embodiments and modified examples may be implemented in combination as necessary.

3-1. Method of Automatically Allocating Settings

In the second exemplary embodiment, each of the settings may be weighted in the process of automatically allocating the settings during the generation of the plural templates. In that case, an operation for determining the weight of each of the settings is performed on the template editing screen B11 illustrated in FIG. 13, for example.

FIG. 15 illustrates an example of a template editing screen of the present modified example. In FIG. 15, the client terminal 2a displays a weight setting image G11 over the template editing screen B11. The weight setting image G11 is an image for determining the respective weights of the options of the setting item "DUPLEX" to be automatically allocated. In this example, the respective weights of the options "LONG-SIDE BINDING," "HEAD-TO-HEAD," and "HEAD-TO-TOE" are determined as "50%," "25%," and "25%."

Accordingly, the template generating unit 106 generates the plural templates by adopting "LONG-SIDE BINDING" with a 50% probability and adopting "HEAD-TO-HEAD" or "HEAD-TO-TOE" with a 25% probability as the setting of the item "DUPLEX." The template generating unit 106 thus assigns the weights determined by the user to the respective settings, to thereby change the probability of each of the settings being adopted as a setting of the template in accordance with the weight assigned thereto. Thereby, the tendency of the settings of the plural templates generated by the automatic allocation is controlled based on the intention of the user.

The method of automatically allocating the settings is not limited to the above-described one. For example, the template generating unit 106 may generate plural templates in which the patterns of setting to be allocated appear equally. In the case of the item "DENSITY" illustrated in FIG. 13, for example, the template generating unit 106 may adopt the nine patterns of setting in nine of the ten templates, and randomly adopt one of the nine patterns of setting in the remaining one of the templates. This configuration prevents a situation in which test printing with a pattern of setting desired to be tried is not performed owing to biased adoption of patterns of setting.

3-2. Replication of Template

The method of generating the plural templates is not limited to the above-described one. For example, the plural templates may be generated by generating replicas (copies) of an existing template and changing the settings of the generated copies.

Figure 16:
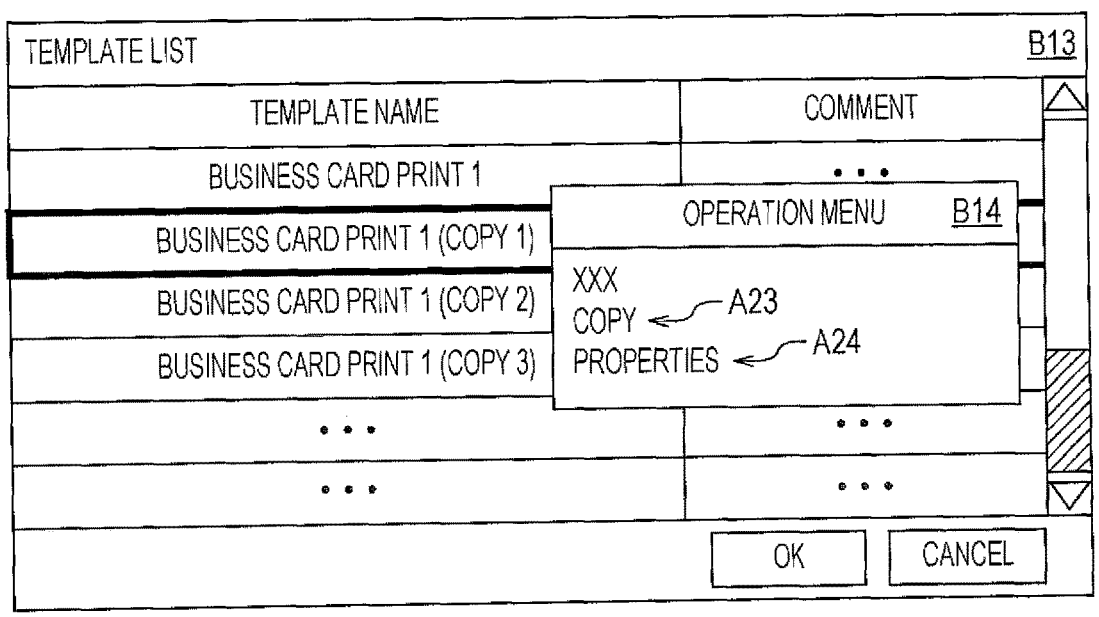
FIG. 16 is a diagram illustrating an example of a template list of a modified example.

FIG. 16 illustrates an example of a template list of the present modified example. In the example of FIG. 16, the template list display 222 illustrated in FIG. 12 displays a template list screen B13. The template list screen B13 displays a template with a name "BUSINESS CARD PRINT 1" and templates with respective names "BUSINESS CARD PRINT 1 (COPY 1)," "BUSINESS CARD PRINT 1 (COPY 2)," AND "BUSINESS CARD PRINT 1 (COPY 3)" obtained by replicating the template with the name "BUSINESS CARD PRINT 1." Further, an operation menu B14 including a copy button A23 and a property button A24 is displayed by, for example, right-clicking performed when the template with the name "BUSINESS CARD PRINT 1 (COPY 1)" is selected.

If an operation of pressing the copy button A23 is performed, the template editing operation receiving unit 231 receives this operation, and the template editing requesting unit 232 requests the image processing unit 10a to replicate the template. The template generating unit 106 receives this request, and replicates the template stored in the template memory 104 to thereby generate a new template. The template generating unit 106 stores the replicated template in the template memory 104.

If an operation of pressing the property button A24 is performed, the property displaying operation receiving unit 211 receives this operation, and the property display 212 displays the properties of the template.

FIG. 17 illustrates an example of a property screen of a template. In FIG. 17, the property display 212 displays a property screen B15 of the template "BUSINESS CARD PRINT 1 (COPY 1)." The property screen B15 displays a reflection button A25 for reflecting the result of editing of the settings performed on this screen and a cancellation button A26 for preventing the reflection of the result of editing.

If the user performs an operation of editing the settings on this screen and pressing the reflection button A25, the template generating unit 106 reads the template corresponding to the displayed properties from the template memory 104, and reflects the changed settings in the template, to thereby generate a new template having the settings changed by the user. The template generating unit 106 overwrites the original template stored in the template memory 104 with the new template having the changed settings. The user repeats this operation of changing the settings, and thereby the three templates "BUSINESS CARD PRINT 1 (COPY 1)," "BUSINESS CARD PRINT 1 (COPY 2)," AND "BUSINESS CARD PRINT 1 (COPY 3)" mutually different in settings are generated from the template "BUSINESS CARD PRINT 1."

The user may also display the properties of each of the plural templates generated by the automatic allocation of the second exemplary embodiment, and change the settings of the template to the settings which the user desires to try in the test printing. In sum, since steps to be taken are increased if the user configures the settings of all items, the steps may be reduced by leaving the configuration of the settings of only some of the items to the user with the use of the templates generated by the automatic allocation and the replicated templates.

3-3. Test Printing

In the second exemplary embodiment, the plural test printing operations continue without a suspension until all thereof are completed. However, the configuration is not limited thereto. For example, the test print controller 103, which outputs and stores the instruction data items reflecting the templates in the instruction data memory 101, may not store the instruction data items other than the first instruction data item in the queue. Then, the test print controller 103 may store the instruction data items in the queue one by one and one at a time when the user performs the operation of starting the test printing.

In this case, the test printing stops each time the test printing operation reflecting one template is completed. After each test printing operation, therefore, the user is allowed to judge the quality of the test-printed image. If the user determines that the quality of the image is sufficient and cancels any further test printing operation, therefore, the cost of power for operating the medium and the image forming apparatus 1 is reduced.

Further, in the test printing, the test print controller 103 may print the pages of a print document not just one by one but two or more at one time, for example, or may print only some of the pages. Further, if one of the pages of the document is divided into plural areas, the test print controller 103 may print only one of the areas.

3-4. Generation of Instruction Data

In the foregoing exemplary embodiments, if the first instruction data and a template are selected, the test print controller 103 generates, separately from the first instruction data, the second instruction data corresponding to the first instruction data with the settings thereof changed to the settings of the template. However, the configuration is not limited thereto, and the settings of the first instruction data may be changed to and overwritten with the settings of the template. In this case, the need for the step of reflecting the settings of the template in the first instruction data is obviated.

3-5. Category of Invention

The present invention may be considered as an image processing device that processes an image, such as the image processing unit 10, an image forming apparatus including the image processing device and an image forming unit, or an image forming system including the image forming apparatus and an apparatus serving as a user interface such as the client terminal 2. The present invention may further be considered as an image processing method for realizing the processes executed by respective devices or a program for causing a computer that controls the respective devices to function. The program may be provided in the form of a recording medium, such as an optical disc, storing the program, or may be provided by being downloaded to the computer through a communication line, such as the Internet, and installed in the computer to be available for use.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
    a memory that stores a template defining settings of printing to be performed by an image forming unit; and
    a processor that executes a program to act as a generating and outputting unit that, if an instructing operation of instructing to perform test printing with the template is performed on a screen displaying the template, generates and outputs instruction data for instructing the image forming unit to perform the test printing reflecting the settings of the template,
    wherein the generating and outputting unit generates, as the instruction data for instructing the image forming unit to perform the test printing reflecting the settings of the template, data representing an instruction to print information identifying the template on a medium on which the test printing with the template is performed.

2. The image processing device according to claim 1, wherein if first instruction data and the template are selected, the generating and outputting unit generates, separately from the first instruction data, second instruction data corresponding to the first instruction data with settings thereof changed to the settings of the template, and outputs the second instruction data as the instruction data for instructing the image forming unit to perform the test printing.

3. The image processing device according to claim 2, wherein the processor further executes the program to act as a first changing unit that, if a specific operation is performed on a screen displayed when the test printing is performed in accordance with an instruction of the second instruction data, changes the settings of the first instruction data to settings of the second instruction data.

4. The image processing device according to claim 1, wherein the memory stores a group including a plurality of templates each defining the settings of the printing to be performed by the image forming unit, and
    wherein the generating and outputting unit generates a plurality of instruction data items for respectively instructing the image forming unit to perform a plurality of test printing operations reflecting the plurality of templates of the group.

5. The image processing device according to claim 1, wherein the processor further executes the program to act as a template generating unit that generates a plurality of templates having mutually different settings of a specific item.

6. An image forming apparatus comprising:
    the image processing device according to claim 1; and
    an image forming unit that forms an image on a medium.

7. An image processing device comprising:
    a memory that stores a template defining settings of printing to be performed by an image forming unit; and
    a processor that executes a program to act as a generating and outputting unit that, if an instructing operation of instructing to perform test printing with the template is performed on a screen displaying the template, generates and outputs instruction data for instructing the image forming unit to perform the test printing reflecting the settings of the template,
    wherein the memory stores a group including a plurality of templates each defining the settings of the printing to be performed by the image forming unit, and wherein the generating and outputting unit generates a plurality of instruction data items for respectively instructing the image forming unit to perform a plurality of test printing operations reflecting the plurality of templates of the group, wherein the memory stores a plurality of groups, each including the plurality of templates, and wherein if an operation of selecting one group from the plurality of groups is performed, the generating and outputting unit generates the plurality of instruction data items for the selected group.

8. The image processing device according to claim 7, wherein if first instruction data and the template are selected, the generating and outputting unit generates, separately from the first instruction data, second instruction data corresponding to the first instruction data with settings thereof changed to the settings of the template, and outputs the second instruction data as the instruction data for instructing the image forming unit to perform the test printing.

9. The image processing device according to claim 8, wherein the processor further executes the program to act as a first changing unit that, if a specific operation is performed on a screen displayed when the test printing is performed in accordance with an instruction of the second instruction data, changes the settings of the first instruction data to settings of the second instruction data.

10. An image forming apparatus comprising:
the image processing device according to claim 7; and
an image forming unit that forms an image on a medium.

11. An image processing device comprising:
a memory that stores a template defining settings of printing to be performed by an image forming unit;
a processor that executes a program to act as:
a generating and outputting unit that, if an instructing operation of instructing to perform test printing with the template is performed on a screen displaying the template, generates and outputs instruction data for instructing the image forming unit to perform the test printing reflecting the settings of the template; and
a template generating unit that generates a plurality of templates having mutually different settings of a specific item,
wherein the template generating unit assigns a weight determined by a user to each of the settings, and changes a probability of the each of the settings being adopted as one of the settings of the template in accordance with the assigned weight.

12. The image processing device according to claim 11, wherein if first instruction data and the template are selected, the generating and outputting unit generates, separately from the first instruction data, second instruction data corresponding to the first instruction data with settings thereof changed to the settings of the template, and outputs the second instruction data as the instruction data for instructing the image forming unit to perform the test printing.

13. The image processing device according to claim 12, wherein the processor further executes the program to act as a first changing unit that, if a specific operation is performed on a screen displayed when the test printing is performed in accordance with an instruction of the second instruction data, changes the settings of the first instruction data to settings of the second instruction data.

14. An image forming apparatus comprising:
the image processing device according to claim 11; and
an image forming unit that forms an image on a medium.

15. An image processing method comprising:
storing, in a memory, a template defining settings of printing to be performed; and
generating and outputting, if an instructing operation of instructing to perform test printing with the template is performed on a screen displaying the template, instruction data for instructing to perform the test printing reflecting the settings of the template; and
generating, as the instruction data for instructing the image forming unit to perform the test printing reflecting the settings of the template, data representing an instruction to print information identifying the template on a medium on which the test printing with the template is performed.

* * * * *